United States Patent [19]

Weisner et al.

[11] 4,278,414
[45] Jul. 14, 1981

[54] APPARATUS FOR MAKING PLASTIC SKYLIGHTS

[75] Inventors: Kent A. Weisner, Orlando; Lester L. Walls, Jr., Deltona, both of Fla.

[73] Assignee: Kennedy Sky-Lites, Inc., Orlando, Fla.

[21] Appl. No.: 12,822

[22] Filed: Feb. 16, 1979

[51] Int. Cl.³ .................................................. B29C 17/00
[52] U.S. Cl. .............................. 425/388; 425/DIG. 48; 425/394
[58] Field of Search ................ 425/388, 387.1, 394, 425/395, 396, DIG. 48

[56] References Cited

U.S. PATENT DOCUMENTS

| Re. 27,435 | 7/1972 | Shelby | 425/388 |
|---|---|---|---|
| 2,784,455 | 3/1957 | Pulaski | 425/388 X |
| 2,952,875 | 9/1960 | Herrick | 425/388 X |
| 3,025,566 | 3/1962 | Kostur | 425/DIG. 48 |
| 3,118,182 | 1/1964 | De Muth | 429/388 |
| 3,238,566 | 3/1966 | Koehler | 425/DIG. 48 |
| 3,256,375 | 6/1966 | Bolelli | 425/DIG. 48 |
| 3,516,122 | 6/1970 | Schwartz | 425/388 X |
| 3,551,954 | 1/1971 | Knowles | 425/388 X |
| 3,599,959 | 8/1971 | Asenbauer | 425/DIG. 48 |
| 3,703,255 | 11/1972 | Wode | 425/388 X |
| 3,953,273 | 4/1976 | Faller | 425/388 X |
| 4,025,275 | 5/1977 | Gournelle | 425/387.1 |
| 4,097,035 | 6/1978 | Shuman | 425/388 X |
| 4,127,328 | 11/1978 | Mendors | 425/394 X |
| 4,143,587 | 3/1979 | Fuji | 425/395 X |

FOREIGN PATENT DOCUMENTS 6701635 8/1967 Netherlands .......................... 425/388

Primary Examiner—J. Howard Flint, Jr.
Attorney, Agent, or Firm—Macdonald J. Wiggins

[57] ABSTRACT

Apparatus for making skylights from thin polymer sheets. Heated clamp frames are provided for clamping the perimeter of a thin polymer sheet and preheating the perimeter thereof to a preselected first temperature. An oven is provided for further heating the preheated perimeter and for heating the center portion of the polymer sheet to a selected second temperature greater than the first temperature to soften the polymer for forming. Upper and lower perimeter platens are provided having a plurality of stepped edges therein which are clamped onto the softened polymer sheet to thereby form a plurality of steps within the perimeter of the polymer sheet. A vacuum forming chamber is provided for forming a dome in the center portion of the polymer sheet above the stepped portion thereof. A push member may also be provided adjacent the upper platen for forming a sharp rise or push around the perimeter of the dome and between the steps and the dome.

6 Claims, 7 Drawing Figures

U.S. Patent        Jul. 14, 1981        Sheet 1 of 2        4,278,414
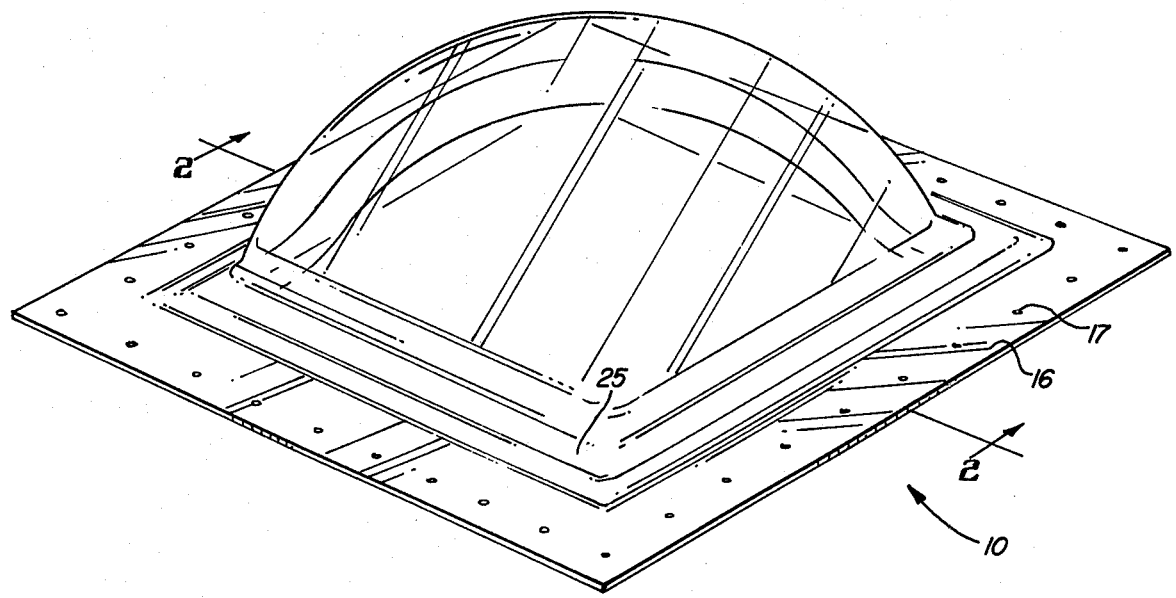
FIG-1
FIG-2
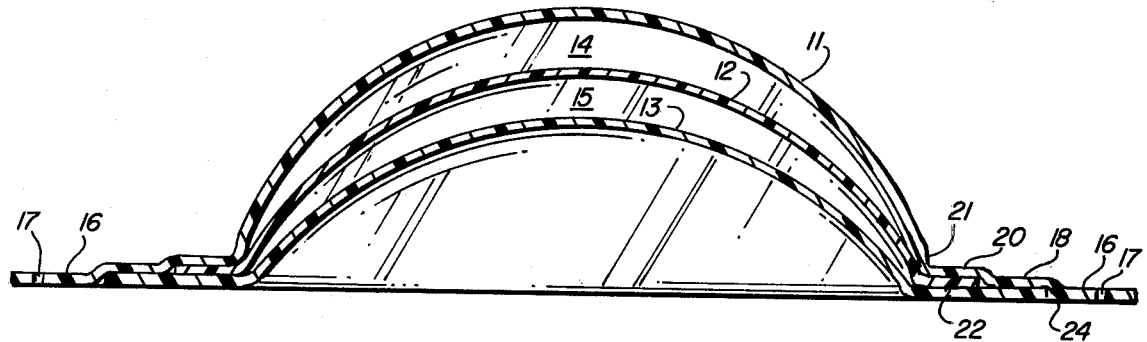
FIG-7

APPARATUS FOR MAKING PLASTIC SKYLIGHTS

BACKGROUND OF THE INVENTION

The present invention relates to skylights formed from plastic sheets and more particularly to apparatus for making skylights from polycarbonate polymer sheets.

In the past, a variety of skylights have been provided which are typically formed from thin sheets of transparent plastic material which is clamped to a mold and vacuum formed. The molds are typically formed with a domed center portion, even though this is not necessarily a spherical shaped dome and which has a perimeter flange which may be attached to the roof of a house. Typically, skylights are attached either directly to a flat portion of a roof, or alternatively, attached to a raised area where the flat perimeter portion of the skylight is covered with flashing. It has also been suggested to provide skylights with self-flashing formed around the perimeter of the skylight. In recent years with the emphasis on energy, it has been suggested to have domes formed with an air space between a pair of domes or between the dome and a flat translucent plastic sheet to thereby entrap air to reduce the movement of heat through the skylight.

Prior art of this type can be seen in U.S. Pat. No. 3,127,699 for a self-flashing skylight unit, which shows a pair of domes forming an air space therebetween in one embodiment, and a dome mounted to a flat transparent sheet in a second embodiment, each to form a dead air space therebetween. Another doubled dome skylight can be seen in U.S. Pat. No. 3,455,073, which mounts a pair of domes together between a plurality of seals to thereby form a dead air space between the domes. Other twin dome type skylights can be seen in U.S. Pat. No. 3,111,786 for a Skylight and Ceiling Light Construction; and in U.S. Pat. No. 4,073,097 for an energy efficient skylight construction; in U.S. Pat. No. 3,417,527 for a skylight dome and in U.S. Pat. No. 3,417,522 and 3,434,250 for dual dome skylights. U.S. Pat. No. 2,858,734 has a skylight having a dead air space formed with special lenses, while U.S. Pat. No. 3,350,823 is an insulated skylight having dual domes filled with a core material. U.S. Pat. No. 3,012,375 has a combination skylight and ceiling light dome formed into one unit, while in U.S. Pat. No. 3,440,779, a pair of flat panels are used to form a skylight. Additional skylight construction can be seen in U.S. Pat. No. 3,983,669 for a skylight and frame; No. 3,461,625 for a self-flashing skylight curve construction; No. 3,473,276 for a domed roof light; No. 2,703,060 for a skylight construction; No. 2,610,593 for skylight construction; No. 2,693,156 for a skylight; No. 3,996,844 for an opening skylight of great stability; and No. 3,934,383 for a roof vent.

In U.S. Pat. No. 2,918,023 to Bettcher, a skylight is illustrated having an upper and lower dome with the lower dome reversed from the upper dome, and in one embodiment, has a transparent sheet connected therebetween to form double air spaces which are reinforced in different manners, as illustrated therein.

SUMMARY OF THE INVENTION

The present invention relates to an apparatus for making a plural dome skylight, in which a thin sheet of polymer material is clamped to a vacuum mold with heated clamps. The clamps and sheet are moved to an oven where the polymer sheet is softened. It is then moved to a forming section where one mold is closed toward the other around the perimeter of the polymer sheet to form a plurality of stepped ledges in the perimeter of the polymer sheet, and simultaneously, adding a push perpendicular to the stepped ledges at the end of the stepped edges around the polymer dome, a dome is vacuum formed in the center portion of the polymer sheet, then adhesively attaching a second dome to the first with the edge portions of the second dome fitting into one step of the plurality of steps, and adhesively attaching a third dome to the first dome with its edges fitting into the second step of the plurality of steps to form a multiple dome skylight. The molding is done in a mold having a plurality of steps formed therein around the vacuum forming area for the dome, and a push attached to one platen for forming a pushed or perpendicular area along the edge of the dome, and also having a heated clamp for preheating the clamping portion of the mold.

BRIEF DESCRIPTION OF THE DRAWINGS

Other objects, features and advantages of the present invention will be apparent from the written description and the drawings, in which:

FIG. 1 is a perspective view of a multi-domed skylight in accordance with the present invention;

FIG. 2 is a sectional view taken on the line 2—2 of FIG. 1;

FIG. 7 is a sectional view of the molded outer dome made in the process of FIGS. 3 through 6.

DESCRIPTION OF THE PREFERRED EMBODIMENTS

Figure 3:
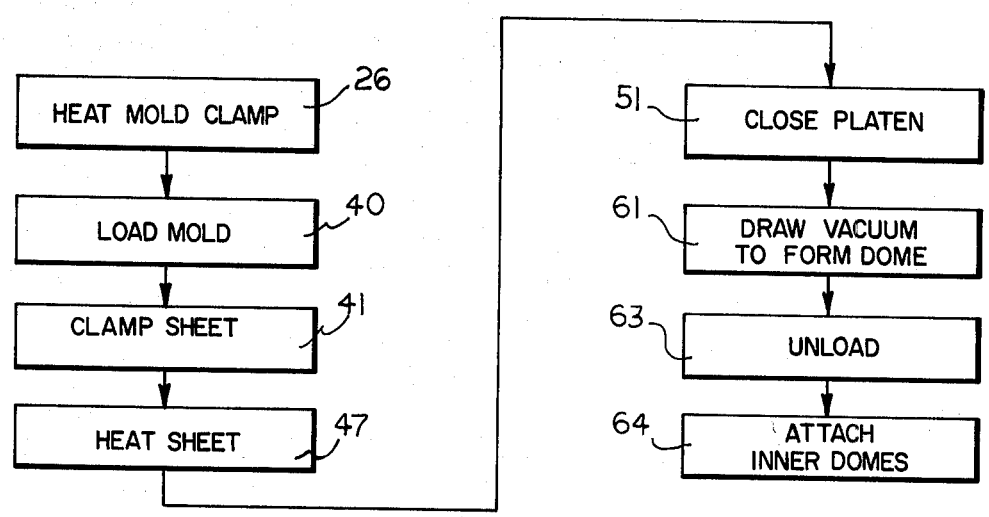
FIG. 3 is a flow diagram of the process of making the outer dome.
Figure 4:
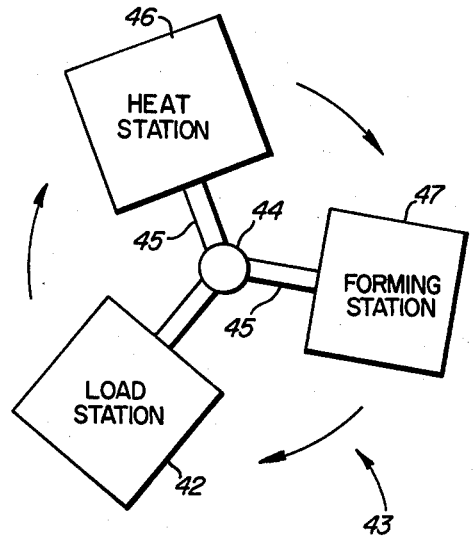
FIG. 4 is a diagram of the layout of the rotating stations of the process in accordance with FIG. 3.

Referring to the drawings, and especially to FIGS. 1 and 2, a multi-domed skylight 10 is illustrated having an outer or first dome 11, an inner second dome 12 and an inner third dome 13. Domes 12 and 13 are each attached to outer dome 11 to form a first air pocket 14 and a second air pocket 15. The double dome is utilized to increase the insulating efficiency of the dome, inasmuch as increasing dead air space between two domes has reduced benefit as the domes are spaced further apart. Thus, the addition of two dead air spaces substantially increases the insulation value across the skylight. The dome 11 has a flange 16 around its periphery, which has clamp marks 17 shown along the edge, but which might also have nail holes punched around the periphery of the skylight dome 11. The outer dome 11 formed with the flange 16 has a first stepped ledge 18 and a second stepped ledge 20 which connects with a perpendicular extending push 21, with each step and push extending around the dome 11. The skylight dome 12 has a short flanged area 22 which fits and is adhesively attached to the stepped area 20, while the dome 13 has a longer flanged area 23 which extends into the stepped ledge 18 where it is adhesively attached. In addition, a substantially smooth surface is provided at 24 where the step ledge is mounted adjacent the flange 16, thereby allowing the entire domed skylight to be placed on a flat roof, if desired, or alternatively, the flange 16 of the outer dome 11 can be formed with a self-flashing rim for fitting over a raised construction, in which event it is also desirable to have a flat surface at 24 for mounting the skylight to the roof. Domes 12 and 13 extending in the same direction and inside of dome 11 advantageously provide an aesthetically pleasing looking interior, as well as exterior to the skylight. This substantially increases the insulation value of the skylight, and the domes have greater strength than would be provided by a flat surface extending across the bottom of the outer dome 11 which would tend to sag and would not be as attractive as the arcuate inner dome 13 from inside of the building. The push area 21 allows the first inner dome 12 to be easily attached to the outer dome 11 without interference from the connecting curved edge 25 at the corner of the dome steps 20, thereby allowing the use of a polymer material that could not otherwise be accommodated in this construction.

Figure 5:
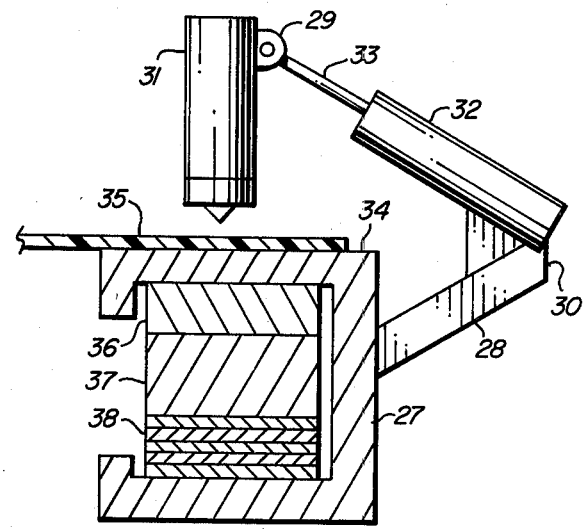
FIG. 5 is a sectional view of a heating clamp for use in the process of FIG. 3.
Figure 6:
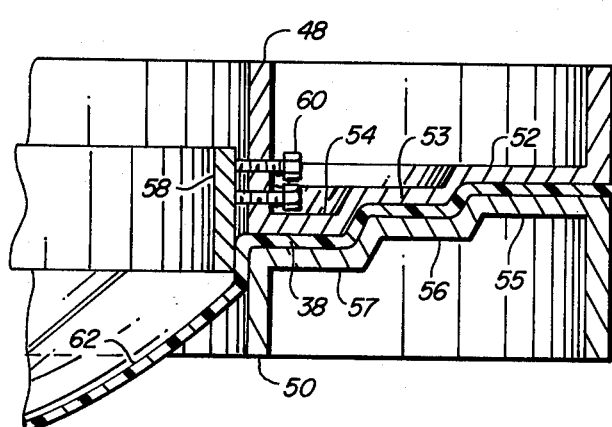
FIG. 6 is a sectional view of the mold, platens and heating clamp for use in the process in accordance with FIG. 3.
Figure 6:
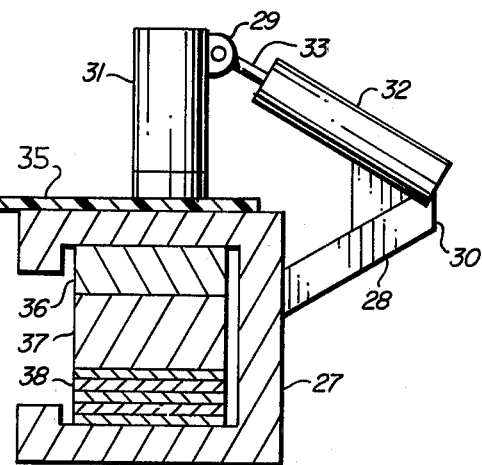

Turning to FIGS. 3 through 7, the method of making a plural domed skylight in accordance with FIGS. 1 and 2 is illustrated with a flow diagram in FIG. 3 providing for heating the mold clamps at 26, which may be illustrated in the sectional view of FIG. 5. A clamping support channel 27 is shown in section having a clamp support rear extension 28 connected by a bracket 30 to a pneumatic cylinder 32 having a cylinder rod 33. A sheet clamping member 31 is attached through a flexible joint 29 to rod 33 and clamps onto sheet 35 when actuated. The clamping support surrounds the vacuum mold and provides a clamping table 34 to which a piece of thin polymer sheet 35 is shown. A heating element 36 which is a silicone heating strip is shaped to fit in the clamp supporting channel 27 and is supported by block 37 with additional adjustable blocks 38 to hold it in place directly beneath the table portion 34 of the channel 27. Heating element 36 may be an electrical heating element, which will heat the upper surface of the clamp channel 27 when actuated prior to beginning the molding operation. The heated clamp frame is then loaded at 40 with a polymer sheet 35 and clamped at 41 as illustrated in FIG. 5. In FIG. 6, the clamp has been actuated against the polymer sheet 35 and the molds are closed. The loading and clamping is done at a loading station 42 on a rotary conveyor 43 rotating on a center pivot 44 and having arms 45 extending therefrom to different tables. The loaded clamp is then rotated to the heating station 46 where it is heated and molded at 47 of FIG. 4. The clamping frames and thin polymer sheet are heated to soften the thin polymer sheet, at which time an upper platen 48 is closed a predetermined distance adjacent a lower platen 50 in step 51.

The platen 48 has the flange area 52, the first step 53, a second step 54 formed therein, combining with a lower flange area 55, a lower first step 56, and a lower second step 57 and having the polymer sheet 35 clamped therebetween to form the stepped outer dome 11 as shown in FIG. 7. In addition, a push element 58 may be bolted with bolts 60 from the inside of the upper platen 48 to push the push area 21. A vacuum is then drawn at 61 of FIG. 3 to pull a dome 62 as shown in FIG. 6 to form the dome 11. It will, of course, be clear that the platens 48, 50 and the push 58 extend around the entire mold to form a periphery platen with the clamping channel 27 extending adjacent the lower platen 50 around the mold, so that a vacuum placed beneath the dome portion 62 will pull the softened polymer sheet inward to form a free-formed dome. The outer dome 11 is then unloaded in step 63 to provide the dome 11 as illustrated in 67 having the flange 16, first step 18, second step 20 and pushed area 21.

The inner domes, which have been formed in a separate vacuum mold may then be attached in step 64 to the outer dome 11, as shown in FIGS. 1 and 2 by adhesively attaching the first inner dome 12 and then adhesively attaching the second inner dome 13. The inner domes are attached with a thin layer of a compound of methylene chloride and polycarbonate resin which is applied to the stepped areas, the inner domes put in place and the domes compressed together for 60 to 90 seconds to flash off methylene chloride solvent and seal the domes together. Other methods that may be used to seal the domes together include electro-magnetic induction bonding using a linear saturated co-polymer polyester in a ribbon form 12 mils thick having stainless steel or iron oxide powder therein so the tape will be heated responsive to electro-magnetic energy. Yet another technique uses a laser beam on tape for bonding. It will, of course, be clear that an additional air space could be formed by a transparent plastic polymer sheet extending beneath the flanged area 16 in some smaller skylights, but would not have sufficient strength without reinforcement to be economically used in anything but the smallest skylights.

It should be clear at this point that apparatus has been provided for making a plural domed skylight, but it may not be clear that the skylight and methods herein shown have been developed for use with a predetermined polycarbonate polymer which provides a transparent plastic of greater strength, but which is otherwise difficult to form in a plural domed skylight. It might also not be clear that for proper operation the clamping brackets 27 need to be preheated to a temperature range of 175°–250° F., so that when shifted to the heating or oven station 46, the heating of the plastic material will further heat the clamps to a temperature range of 250°–320° F. thereby producing the uniform heating required in the forming of polycarbonate polymer materials. The molds at the forming station may or may not be heated. This is dependent upon thickness and type of polymer used. Accordingly, the present invention is not to be construed as limited to the particular forms disclosed herein, which are to be regarded as illustrative rather than restrictive.

We claim:

1. Apparatus for molding skylights from polycarbonate polymer sheets comprising:

heated clamping means for clamping the perimeter of a polycarbonate polymer sheet and for preheating said perimeter to a first selected temperature;

a loading station means for temporarily receiving said heated clamping means to permit insertion of a polycarbonate polymer sheet into said heated clamping means and for clamping and preheating the perimeter of said sheet to thereby form a skylight flange;

heating station means adjacent said loading station means for receiving said heated clamping means subsequent to preheating of said perimeter and for heating said polycarbonate polymer sheet and said perimeter to a second selected temperature higher than said first selected temperature;

forming station means adjacent said heating station means for receiving said heated clamping means subsequent to heating of said sheet and said perimeter to said second selected temperature;

a pair of coacting perimeter molds within said heated clamping means, each of said molds having a plurality of coacting steps therein to form steps in a skylight dome perimeter within said flange, said molds forming an open dome-forming area in the center of said sheet for vacuum forming a dome therein;

a push member removably mounted to said mold around the inner edge thereof and extending along the mold edge for driving a pushed area along said dome perimeter when said molds are closed; and vacuum forming means for applying a vacuum to one face of said open dome-forming area to produce a dome in said center of said heated sheet;

whereby said apparatus molds a skylight having a flat outer flange, a stepped perimeter within said flange, a push within said stepped perimeter and a dome above said push.

2. Apparatus in accordance with claim 1 in which said heated clamping means includes pneumatic clamping cylinders for driving a cylinder rod against a thin polymer sheet placed upon a table portion of said clamping means.

3. Apparatus in accordance with claim 1 in which said push member is a shaped aluminum bar extending around an upper one of said molds and bolted thereto for pushing a portion of the polycarbonate polymer sheet when said coacting perimeter molds are closed.

4. Apparatus in accordance with claim 1 in which said first temperature is within the range of 175° F. to 250° F. and said second temperature is within the range of 250° F. to 370° F.

5. Apparatus for producing a skylight having flat perimeter flanges from an essentially transparent polymer plastic sheet comprising:

clamp frames for clamping the perimeter of a thin polymer sheet;

heating elements thermally connected to said clamp frames for preheating the perimeter of the thin polymer sheet to a first temperature;

oven for heating said clamp frames and the thin polymer sheet subsequent to preheating of the perimeter thereof to a uniform second temperature greater than the first temperature, thereby softening the thin polymer sheet;

upper and lower platens disposed within said clamp frames and having a plurality of steps formed therein and adapted to close on the softened polymer sheet to thereby form a stepped outer dome portion therein; and a vacuum drawing element adjacent said lower platen for pulling the softened polymer sheet inward to form a free-formed dome connected to the stepped outer dome portion.

6. Apparatus in accordance with claim 5 which further comprises a push member in the form of a shaped aluminum bar extending around said upper platen and bolted thereto for producing a push in said sheet between the stepped outer dome portion and the free-formed dome.

* * * * *